US012783044B2

(12) United States Patent
Ercan et al.

(10) Patent No.: US 12,783,044 B2
(45) Date of Patent: Nov. 3, 2026

(54) USER INTERFACE ELEMENT STABILITY

(71) Applicant: Apple Inc., Cupertino, CA (US)

(72) Inventors: Ali Ercan, San Jose, CA (US); Julian K. Shutzberg, San Francisco, CA (US); Daniel J. Brewer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/953,312

(22) Filed: Nov. 20, 2024

(65) Prior Publication Data

US 2025/0208701 A1 Jun. 26, 2025

Related U.S. Application Data

(60) Provisional application No. 63/612,554, filed on Dec. 20, 2023.

(51) Int. Cl.

| | |
|---|---|
| ***G06F 3/04815*** | (2022.01) |
| ***G06F 3/01*** | (2006.01) |
| ***G06F 3/0487*** | (2013.01) |

(52) U.S. Cl.
CPC .............. *G06F 3/012* (2013.01); *G06F 3/017* (2013.01); *G06F 3/04815* (2013.01); *G06F 3/0487* (2013.01)

(58) Field of Classification Search
CPC ...... G06F 3/012; G06F 3/017; G06F 3/04815; G06F 3/0487
See application file for complete search history.

(56) References Cited

U.S. PATENT DOCUMENTS

| | | | | |
|---|---|---|---|---|
| 10,564,801 | B2 * | 2/2020 | Baba | G06T 19/20 |
| 2005/0075557 | A1 * | 4/2005 | Kamiyama | A63F 13/10 600/407 |
| 2006/0197832 | A1 * | 9/2006 | Yamada | G02B 27/017 348/E5.145 |
| 2013/0028489 | A1 * | 1/2013 | Tracton | G06V 40/20 382/128 |
| 2019/0362557 | A1 * | 11/2019 | Lacey | G06T 5/20 |
| 2021/0065455 | A1 * | 3/2021 | Beith | G06F 3/0426 |
| 2021/0191600 | A1 * | 6/2021 | Lemay | G06F 3/013 |
| 2022/0129080 | A1 * | 4/2022 | Yasuda | G02B 27/0093 |
| 2022/0214743 | A1 * | 7/2022 | Dascola | G06F 3/017 |

* cited by examiner

*Primary Examiner* — Afroza Chowdhury
(74) *Attorney, Agent, or Firm* — Thompson Hine LLP

(57) ABSTRACT

Methods, devices, and systems, in some implementations, stabilize user interface element using a stabilization property that is determined based on assessing the user's movement, e.g., assessing a hand movement characteristic and a head movement characteristic. In one example, the stabilization property restricts movement of user interface elements in certain circumstances, e.g., based on based on head movement (e.g., angular speed), hand movement (e.g., pinch centroid angular speed), and/or hand translation (e.g., pinch centroid speed).

22 Claims, 9 Drawing Sheets

USER INTERFACE ELEMENT STABILITY

CROSS-REFERENCE TO RELATED APPLICATIONS

This application claims the benefit of U.S. Provisional Application Ser. No. 63/612,554 filed Dec. 20, 2023, which is incorporated herein in its entirety.

TECHNICAL FIELD

The present disclosure generally relates to assessing user interactions with electronic devices that involve hand-based input, e.g., a user moving a hand while pinching or other making another hand gesture to reposition a user interface element within a three-dimensional environment such as a three-dimensional (3D) extended reality (XR) environment.

BACKGROUND

Existing user interaction systems may be improved with respect to facilitating interactions based on user activities.

SUMMARY

Various implementations disclosed herein include devices, systems, and methods that reposition user interface elements based on user activities. Some implementations determine how to move a user interface element based on interpreting hand-based input relative to a reference point, e.g., a reference point on the user's body. For example, the position of a user interface element such as a window may be controlled based on (a) a ray direction from a reference point located at a user's shoulder joint through a hand position located at the user's pinch position and/or (b) a distance between the shoulder point and the pinch position. A pinch position may be a pinch centroid that is determined to be an intermediate point at which a pinch is considered to occur, e.g., based on index fingertip and thumb-tip positions. A reference point such as a shoulder joint may have a location that is not continuously observed by sensors on the device, e.g., a user's torso may be only occasionally captured by sensors on a head-mounted device (HMD). The location of such a reference point may thus be determined based on inferring the position and/or orientation of a portion of the user's body (e.g., the user's torso) from a position and/or orientation of another portion of the user's body (e.g., the user's head) with which more continuous observation data is available. Such inference may, in some circumstances, result in inaccurate reference positions (e.g., a determined shoulder joint position and/or orientation that does not correspond to the position and/or orientation of the user's shoulder). Such inaccuracy may result in undesirable responses to user activity that is based on the inferred reference point. In one example, inaccurate reference point positioning results in accuracy during a user interaction in which the user is moving their hand to control the movement of a user interface element. Inaccuracy may result, for example, based on head pose where head rotation is interpreted as, but does not actually correspond to, reference point movement. Such inaccurate reference point movement may result in unintended movement of the user interface element. Some implementations stabilize a UI element using a stabilization property that is determined based on assessing the user's movement, e.g., assessing a hand movement characteristic and a head movement characteristic. In one example, the stabilization property restricts movement of user interface elements in certain circumstances, e.g., based on head movement (e.g., angular speed), hand movement (e.g., pinch centroid angular speed), and/or hand translation (e.g., pinch centroid speed). A stabilization property, for example, may be used to restrict and/or minimize user interface movement that is based on a reference point in circumstances in which an inferred reference position is more likely to be inaccurate.

In some implementations, a processor performs a method by executing instructions stored on a computer readable medium of an electronic device having one or more sensors. The method involves tracking a hand movement characteristic corresponding to a hand. The hand may be tracked based on first sensor data obtained via the one or more sensors. Tracking the hand characteristic may involve tracking movement, angular speed, or other attribute of a pinch centroid, i.e., a position associated with user gesture involving pinching together two or more fingers. In one example, a position of a pinch (e.g., pinch centroid) is determined based on images captured by the one or more sensors, e.g., via outward facing sensors of a head mounted device (HMD).

The method may further involve determining a head movement characteristic corresponding to a head. The head may be tracked based on second sensor data obtained via the one or more sensors. A reference position (e.g., shoulder joint, chest point, elbow joint, wrist joint, etc.) may be determined based on the head position (e.g., a tracked head pose). Determining the head movement characteristic may involve data from the one or more sensors. For example, this may involve using motion sensors and/or other sensors on an HMD worn on a head of a user to track head pose (e.g., 6DOF position and orientation) and using that head pose to infer probably shoulder positions, e.g., based on an assumed fixed relationship between head pose and shoulder position. In some implementations, the head movement characteristic may include a measure of motion of the head such as angular speed, etc.

The method may further involve determining a stabilization property based on the hand movement characteristic and the head movement characteristic. In one example, the stabilization property is determined based on detecting head rotation that is mostly independent of and/or significantly different than hand motion, i.e., a circumstance in which a reference position inferred based on head position may be inaccurate. The stabilization property may fix the position of a user interface element that is being controlled by the hand motion (e.g., allowing no movement of the user interface element when a threshold head-to-hand motion differential is exceeded). The stabilization may dampen movement of the user interface element based on the relative amount that head motion exceeds hand motion.

The method may further involve repositioning a user interface element displayed by the device based on a three-dimensional (3D) position of the hand (e.g., pinch centroid location), a 3D position of the reference position (e.g., shoulder location), and the stabilization property. This may involve fixing or dampening movement of the user interface element in certain circumstances. Such fixing or dampening may prevent unintended movement of the user interface element, for example, in circumstances in which a user shakes their head from side-to-side. Such side-to-side head motion may otherwise (without the fixing or dampening) cause movement of the UI element by causing inaccurate movement of a reference position associated with the head's pose that does not correspond to the position of the portion of the user's body associated with the reference position, e.g., an inferred shoulder position may differ from the actual shoulder position as the user shakes their head side-to-side. Implementations disclosed herein stabilize user interface elements in these and other circumstances in which certain user activity is not intended to result in user interface element motion and/or inferred reference point position may be inaccurate.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
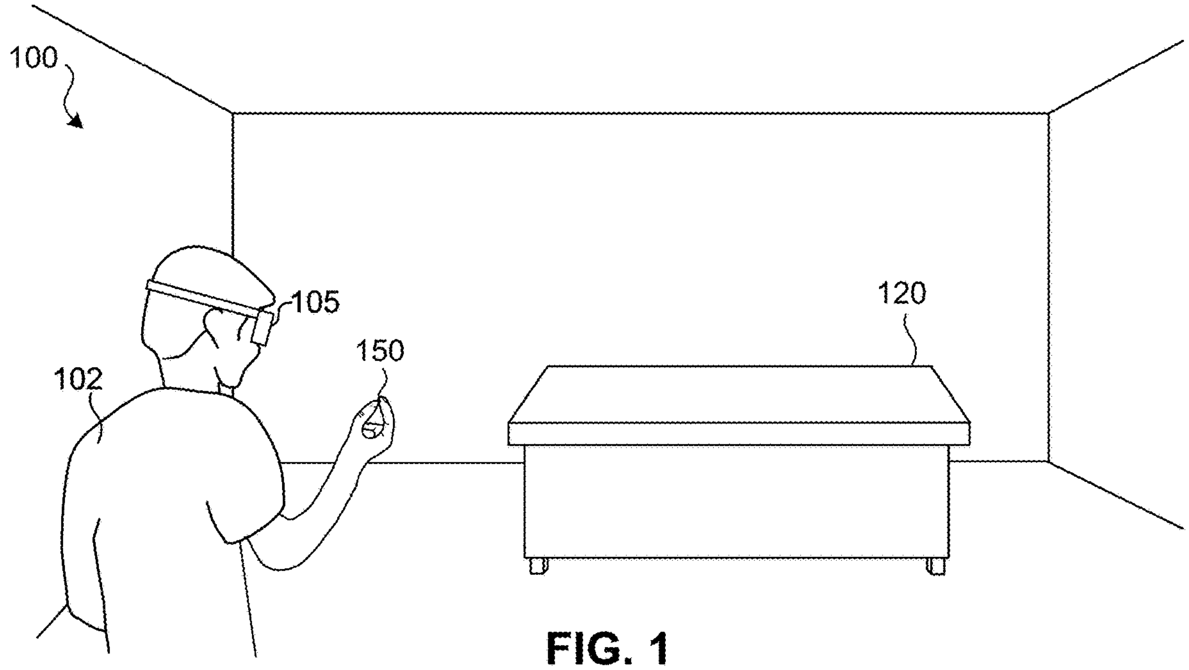
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary an electronic device 105 operating in a physical environment 100. In the example of FIG. 1, the physical environment 100 is a room that includes a desk 120. The electronic device 105 may include one or more cameras, microphones, depth sensors, or other sensors that can be used to capture information about and evaluate the physical environment 100 and the objects within it, as well as information about the user 102 of electronic device 105. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic device 105 (e.g., a wearable device such as an HMD, a handheld device such as a mobile device, a tablet computing device, a laptop computer, etc.). Such an XR environment may include views of a 3D environment that are generated based on camera images and/or depth camera images of the physical environment 100, as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

Figure 2A:
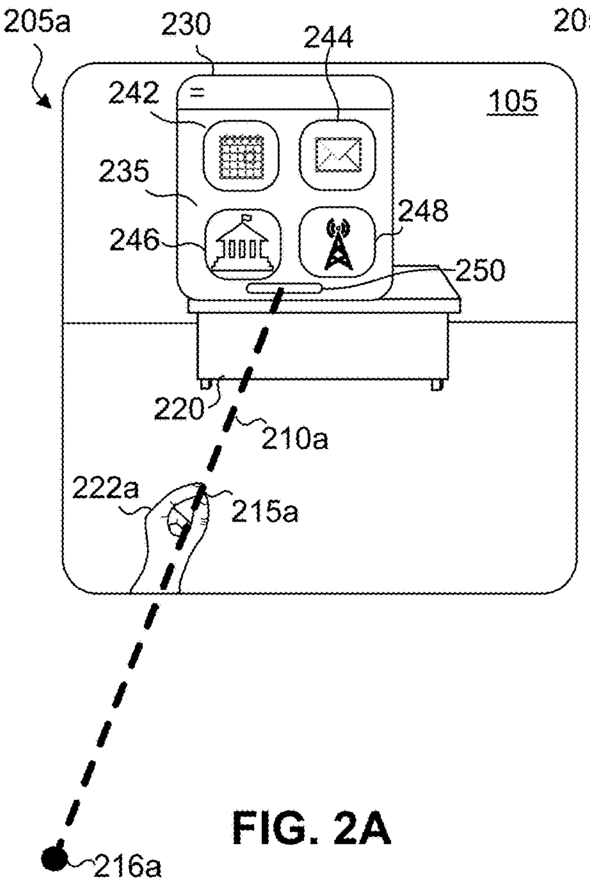
FIGS. 2A, 2B, and 2C illustrate views, provided via a device, of a user interface element within the 3D physical environment of FIG. 1 in which the user performs a gesture relative to reference positions to move the user interface element, in accordance with some implementations.
Figure 2B:
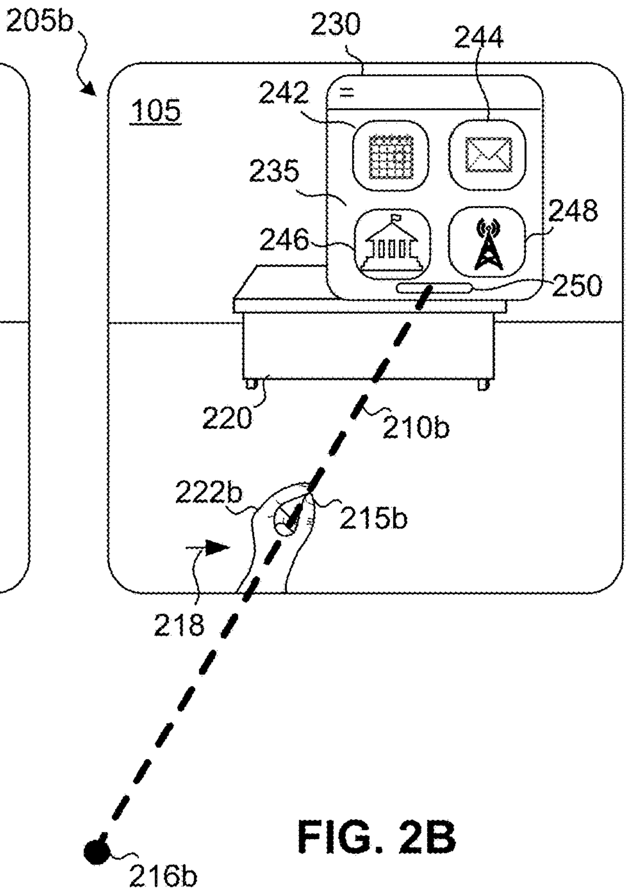
Figure 2C:
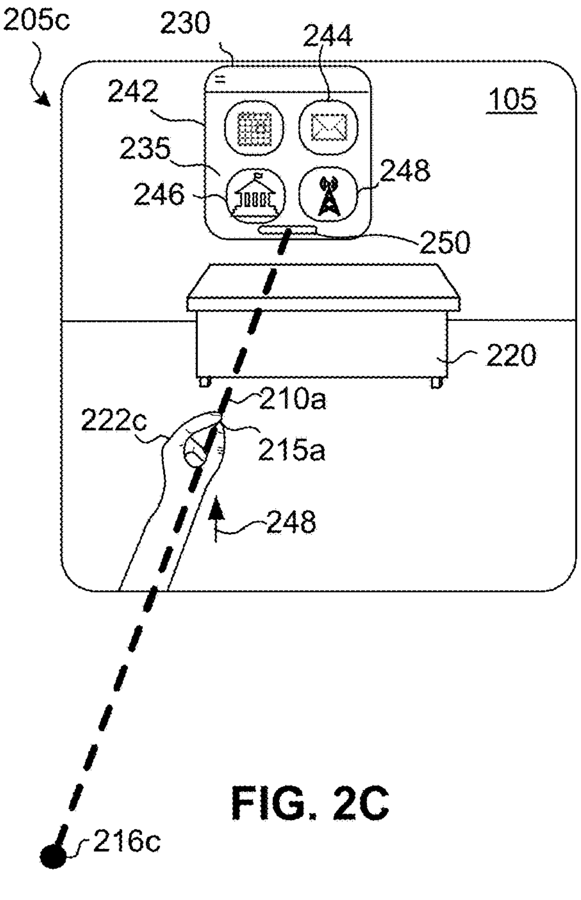

FIGS. 2A-2C illustrate views 205*a-c* of an XR environment, provided via a device. The XR environment includes a user interface element 230 at various 3D positions relative to the 3D physical environment of FIG. 1. In this example, the user performs various gestures relative to one or more reference positions to move the user interface element 230. The XR environment includes an exemplary user interface element 230 depicting a user interface of an application (i.e., an example of virtual content) and a depiction 220 of the desk 120 (i.e., an example of real content). Providing such views 205*a-c* may involve determining 3D attributes of the physical environment 100 and positioning the virtual content, e.g., user interface element 230, in a 3D coordinate system corresponding to that physical environment 100.

In the examples of FIGS. 2A-C, the user interface element 230 includes various user interface features, including a background portion 235 and feature icons 242, 244, 246, 248, and window movement icon 250. The icons 242, 244, 246, 248, 250 may be displayed on a flat front surface of user interface 230. The user interface element 230 may provide a user interface of an application, as illustrated in this example. The user interface element 230 is simplified for purposes of illustration and user interfaces in practice may include any degree of complexity, any number of content items, and/or combinations of 2D and/or 3D content. The user interface element 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface element 230 is flat. In this example, the background portion 235 includes aspects of the user interface element 230 being displayed except for the feature icons 242, 244, 246, 248. Displaying a background portion of a user interface of an operating system or application as a flat surface may provide various advantages. Doing so may provide an easy to understand or otherwise use portion of an XR environment for accessing the user interface of an application. In some implementations, multiple user interfaces (e.g., corresponding to multiple, different applications) are presented sequentially and/or simultaneously within an XR environment, e.g., within one or more colliders or other such components.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment. In other cases, user movements will affect the position and/or orientation of the user interfaces within the 3D environment. The user 102 may intentionally (or unintentionally) perform movements that result in repositioning of the user interface within the 3D environment.

In some implementations the user interface element 230 has a flat portion (e.g., background portion 235) that is desirably positioned in a generally orthogonal orientation such that it generally faces the user's torso, i.e., is orthogonal to a direction (not shown) from the user to the user interface element 230. For example, providing such an orientation may involve reorienting the user interface element 230 when the user moves and/or when the user provides input changing the positioning of the user interface element 230 such that the flat portion remains generally facing the user.

The initial position of the user interface within the 3D environment (e.g., when an app providing the user interface is first launched) may be based on determining a predetermined distance of the user interface from the user (e.g., from an initial or current user position) and predetermined direction (e.g., directly in front of the user and facing the user). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and numerous other factors.

Two examples are depicted in FIGS. 2A-2C. In the first example illustrated using FIGS. 2A-B, while performing a hand gesture (e.g., a pinch), the user 102 moves their hand from an initial position as illustrated by the position of the depiction 222*a* in view 205*a*. The hand (while pinching) moves along a path to a later position as illustrated by the position of the depiction 222*b* in the view 205*b* of FIG. 2B. In the second example illustrated using FIG. 2A and FIG. 2C, while performing a hand gesture (e.g., a pinch), the user 102 moves their hand from an initial position as illustrated by the position of the depiction 222*a* in view 205*a*. The hand (while pinching) moves along a path to a later position as illustrated by the position of the depiction 222*c* in the view 205*c* of FIG. 2C.

Implementations disclosed herein interpret such user movements based on determining a 3D position of the user's hand relative to one or more reference positions. For example, the reference positions may be determined based on determining (i.e., estimating) a current position of a feature of the user's torso (e.g., a shoulder joint position, chest center position, etc.), other body part (e.g., an elbow position, a wrist position, etc.), or other position that may be based upon, but outside of, the user's body (e.g., a position 5 inches in front of the user's chest).

In the examples of FIGS. 2A-2C, the reference positions 216*a-c* correspond to a shoulder position. Specifically, at the time of view 205*a*, the reference position is reference position 216*a* based on a determination/estimation of the user's current shoulder position. At the time of view 205*b*, the reference position is reference position 216*b* based on a determination/estimation of the user's then current shoulder position. At the time of view 205*c*, the reference position is reference position 216*c* based on a determination/estimation of the user's then current shoulder position. Note that these reference positions are in 3D space rather than the 2D views and thus are depicted outside of the views.

The user's gesture (i.e., the positioning of their hand while pinching) and movement are interpreted based on the reference positions. At a point in time (e.g., every frame of a sequence of frames used to display the views), the current position of the reference position and the current position of the user's hand are used to determine how to position a corresponding user interface element.

In these examples, the user's gesture is associated with window movement icon 250. Generally, the user initiates an interaction with the window movement icon 250 (e.g., by pinching while gazing at the window movement icon 250). The user's gaze may be tracked and the gaze direction relative to user interface components in the XR environment may be used to identify when the user is gazing at particular user interface elements. After interaction with the window movement icon is initiated, subsequent movement (e.g., movement of the hand while the pinch continues) is interpreted to move the user interface element 230 that is associated with the user interface movement icon 250, i.e., as the user moves their hand left, right, up, down, forward, and backward, corresponding movements are performed for the user interface element 230. Such movements of the user interface element 230 change its position within the 3D XR environment and thus within the 2D views of the XR environment provided to the user. Between views 205*a* and 205*b*, the user moves their hand to the right from the position of depiction 222*a* to the position of depiction 222*b*. Between views 205*a* and 205*c*, the user moves their hand to the away from their body, from the position of depiction 222*a* to the position of depiction 222*c*. These changes in hand position are interpreted based on reference positions (i.e., reference positions 216*a-c*) to reposition the user interface element 230 as explained next.

The reference position(s) (e.g., reference position 216*a*, 216*b*, 216*c*) are used to determined how to interpret the hand's position, i.e., how to reposition the user interface element 230 based on the hand's current position. Specifically, in this example, as the user moves their hand (and/or the reference position), a ray from the reference position through a point associated with the hand (e.g., a pinch centroid) is moved. The ray is used to reposition the user interface element 230.

In a first example, a user movement corresponds to the change from FIG. 2A to FIG. 2B. The ray 210*a* intersects the window movement icon 250 at a position shown FIG. 2A. The user's movement and/or reference position change results in the ray 210*b* (FIG. 2B) having a different 3D position within the XR environment. The window movement icon 250 (and the user interface element 230 in which it is found) is repositioned the XR environment to maintain the intersection of the ray 210*b* with the window movement icon 250. In this example, the change of ray 210*a* to ray 210*b* results in the user interface element 230 moving to the right. From the user's perspective, the user has pinched while looking at the window movement icon 250 and then moved their hand to the right in direction 218 while pinching to cause a corresponding drag of the user interface element 230 to the right, i.e., it appears to the right (in the view 205*b*) of its prior position (in the view 205*a*). During the user arm movement, intermediate views may be displayed between the views 205*a* and 205*b* showing the user interface 230 moving between these two positions, i.e., based on determining rays in a similar manner during the course of the user's movement of their hand during the time between views 205*a* and 205*b*.

In a second example, a user movement corresponds to the change from FIG. 2A to FIG. 2C. The ray 210*a* intersects the window movement icon 250 at a position shown FIG. 2A. The user's movement and/or reference position change results in the ray 210*c* (FIG. 2C) having a different 3D position within the XR environment. The window movement icon 250 (and the user interface element 230 in which it is found) is repositioned in the XR environment to maintain the intersection of the ray 210*c* with the window movement icon 250. In this example, the change of ray 210*a* to ray 210*c* results in the user interface element 230 moving to the away from the user. From the user's perspective, the user has pinched while looking at the window movement icon 250 and then moved their hand to the right outward in direction 248 (away from their body) while pinching to cause corresponding drag of the user interface element 230 to away from themselves, i.e., it appears smaller and/or further away in the view 205*c*. During the user arm movement, intermediate views may be displayed between the views 205*a* and 205*c* showing the user interface 230 moving between the two depicted positions, i.e., based on determining rays in a similar manner during the course of the user's movement of their hand during the time between views 205*a* and 205*c*.

Note that, in some implementations, a user interface element 230 may be configured to always remain gravity or horizon aligned, such that head, body changes, and/or user window movement control gestures in the roll orientation would not cause the UI to move within the 3D environment.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving their hand in the physical environment 100, e.g., through empty space, but that hand (i.e., a depiction or representation of the hand) may have a 3D position that is associated with a 3D position within an XR environment that is based on that physical environment. In this way, the user may virtually interact in 3D with the virtual content.

Figure 3A:
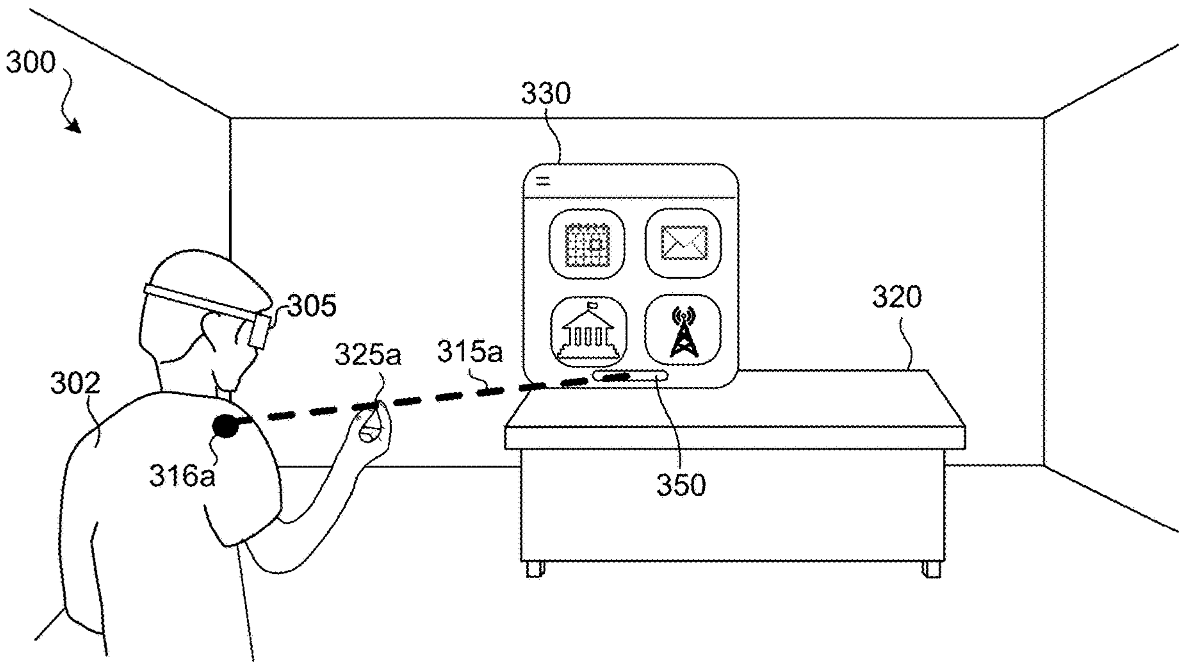
FIG. 3A-3B illustrate a user activity interpreted to move a user interface element, in accordance with some implementations.
Figure 3B:
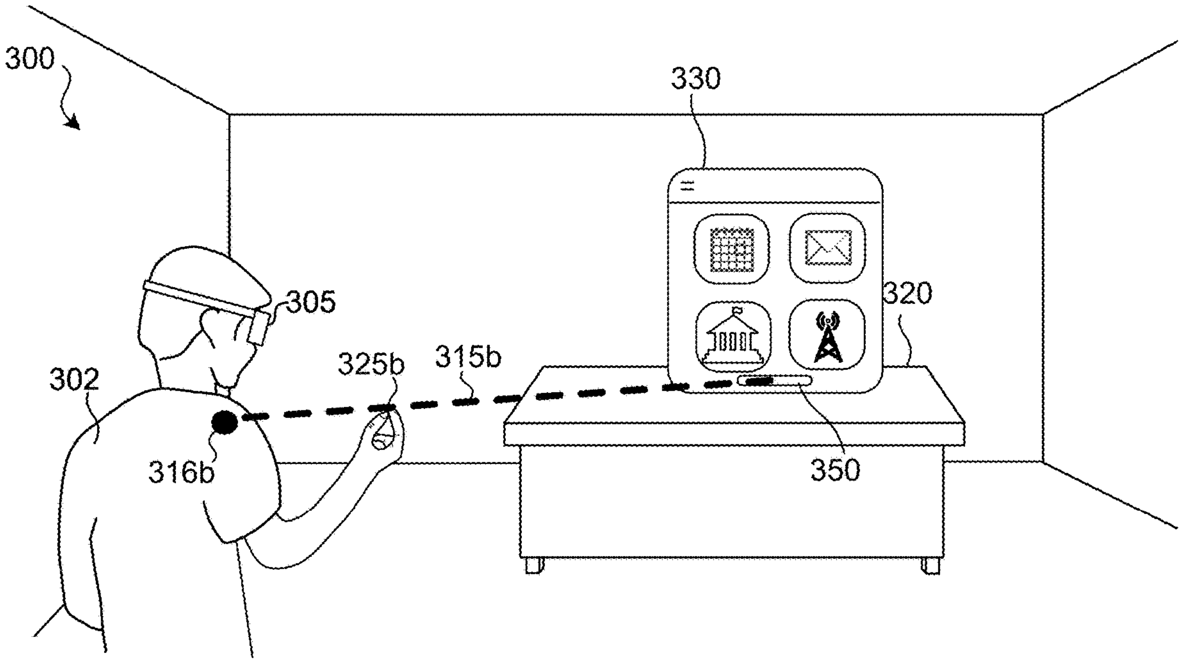

FIG. 3A-3B illustrate a user activity interpreted to move a user interface element within an XR environment 300. The XR environment 300 includes (and provides relative 3D positioning of) a combination of real-world content (e.g., user 302, device 305, desk 320) and virtual content (e.g., user interface element 330). Rays 315*a* and 315*b* are provided in FIGS. 3A and 3B for illustration purposes and could be determined to facilitate user interface element repositioning but would generally not be (although they could be) displayed or represented in the XR environment 300.

In this example of FIGS. 3A-3B, a user movement corresponds to a change in the position of the user 302 from FIG. 3A to FIG. 3B. In this example, a user shoulder joint position is used as a reference position for interpreting user interaction. The device 305 may, for example, determine a device pose (i.e., position and orientation), which corresponds to the user's head pose. Since the user is wearing the device 305, a fixed relationship between the device 305 and the user's head is considered to be fixed/unchanging. Moreover, the shoulder joint position may be estimated based on the device pose and/or corresponding head pose since the positional relationship between the head and shoulder joint will generally (but not always) be consistent. Some implementations disclosed herein detect circumstances in which head pose changes do not (or are unlikely to) correspond to torso-based reference position changes, and control user interface element repositioning accordingly.

In the example of FIGS. 3A and 3B, the reference position corresponds to a shoulder joint position that is inferred or estimated based on a head-worn device pose and/or head pose. Such inference may be appropriate, for example, in circumstances in which direct information about shoulder joint position (e.g., information about torso pose, etc.) is limited or unavailable. For example, an HMD may have generally continuous motion sensor and/or other sensor data from which device/head pose may be determined continuously during a user experience. On the other hand, the HMD may, for example, have less or no sensor data corresponding to the pose of the user's torso, shoulder, or other lower body portion to which a reference point corresponds. In light of this limited information, the device/head pose information and the typical positional relationship of the device/head to the torso/shoulder joint position may be used to predict the reference point location, e.g., reference positions 316*a-b*.

The reference point is used to interpret user interaction, i.e., specify current user interface element location. In FIG. 3A, a ray 315*a* is determined to extend from the reference point 316*a* through pinch centroid position 325*a* and intersect the window movement icon 350 at a position in the XR environment 300 as shown FIG. 3A. The user's movement and/or reference position change results in the ray 315*b* (FIG. 3B) having a different 3D position within the XR environment 300. The ray 315*b* is determined to extend from the reference point 316*b* (determined based on the HMD/head pose at the time of FIG. 3B) through the pinch centroid position 325*b*. The window movement icon 350 (and the user interface element 330 in which it is found) is repositioned the XR environment 300 to maintain the intersection of the ray 315*b* with the window movement icon 350. In this example, the change of ray 315*a* to ray 315*b* in the XR environment 300 results in the user interface element 330 moving to the right. From the user's perspective, the user has pinched while looking at the window movement icon 350 and then moved their hand to the right while pinching to cause a corresponding "drag" of the user interface element 330 to the right.

Figure 4A:
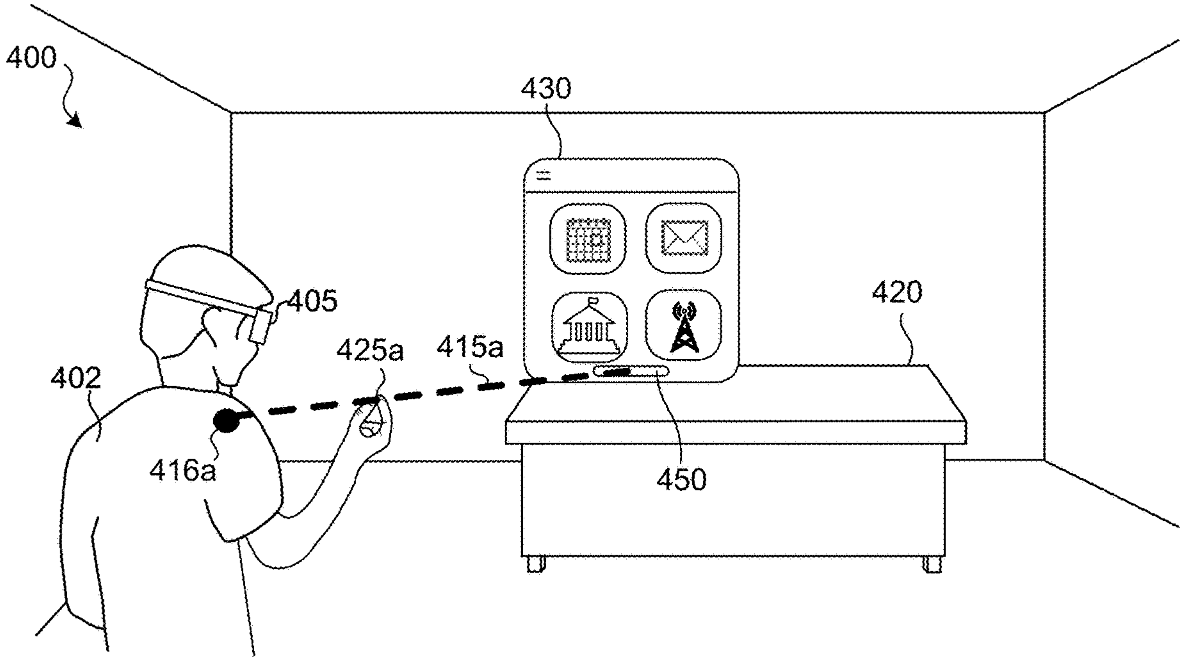
FIG. 4A-4B illustrate a user activity interpreted to move a user interface element, in accordance with some implementations.
Figure 4B:
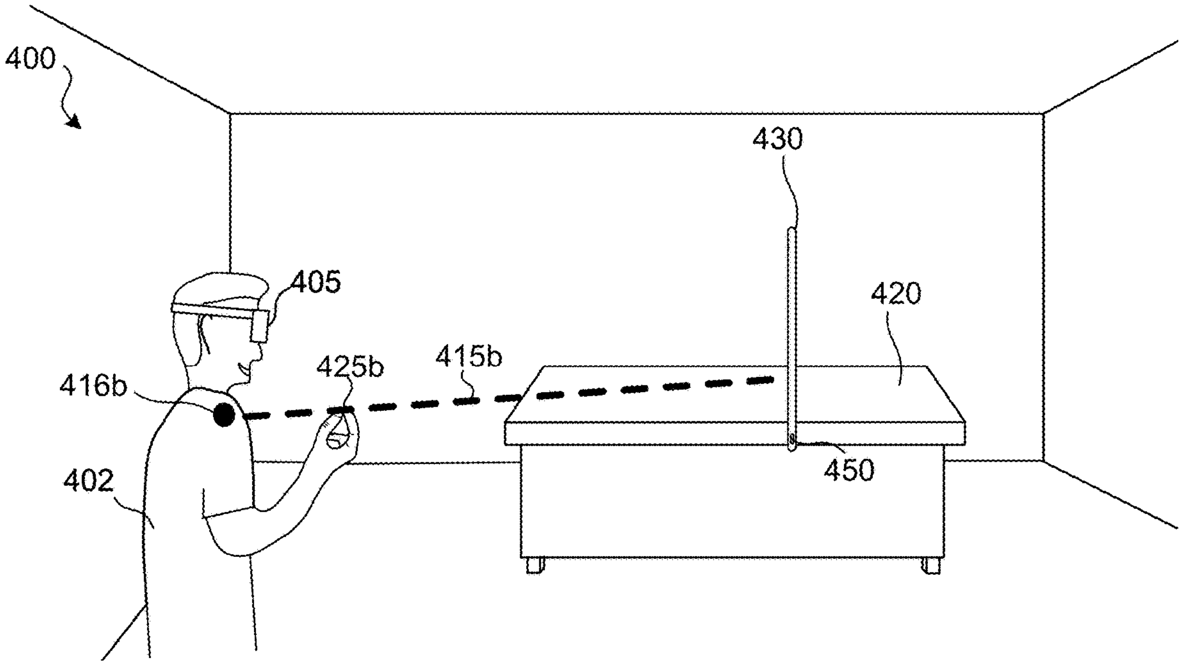

FIG. 4A-4B illustrate another user activity interpreted to move a user interface element. The XR environment 400 includes (and provides relative 3D positioning of) a combination of real-world content (e.g., user 402, device 405, desk 420) and virtual content (e.g., user interface element 430). Rays 415*a* and 415*b* are provided in FIGS. 4A and 4B for illustration purposes and could be determined to facilitate user interface element repositioning but would generally not be (although they could be) displayed or represented in the XR environment 400.

In this example of FIGS. 4A-4B, a user movement corresponds to a change in the position of the user 402 from FIG. 4A to FIG. 4B as the user 402 turns, rotating their body to the right, while performing a pinch gesture. In this example, a user shoulder joint position is again used as a reference position for interpreting user interaction. The device 405 may, for example, determine a device pose (i.e., position and orientation), which corresponds to the user's head pose. Since the user is wearing the device 405, a fixed relationship between the device 405 and the user's head is considered to be fixed. Moreover, the shoulder joint position may be estimated based on the device pose and/or corresponding head pose since the positional relationship between the device/head and shoulder joint will generally (but not always) be consistent. As noted above, some implementations disclosed herein detect circumstances in which head pose changes do not (or are unlikely to) correspond to torso-based reference position changes, and control user interface element repositioning accordingly.

In the example of FIGS. 4A-4B, the reference position corresponds to a shoulder joint position that is inferred or estimated based on a head-worn device pose and/or head pose. The reference point is used to interpret user interaction. In FIG. 4A, a ray 415*a* is determined to extend from the reference point 416*a* through pinch centroid position 425*a* and intersect the window movement icon 450 at a position in the XR environment 400 as shown FIG. 4A. The user's movement (i.e., the user turning their entire body to the right) and/or reference position change results in the ray 415*b* (FIG. 4B) having a different 3D position within the XR environment 400. The ray 415*b* is determined to extend from the reference point 416*b* (determined based on the HMD/head pose at the time of FIG. 4B) through the pinch centroid position 425*b*. The window movement icon 450 (and the user interface element 430 in which it is found) is repositioned the XR environment 400 (i.e., essentially rotating around to the user to be positioned on the right side of the user 402 and in front of desk 420) to maintain the intersection of the ray 415*b* with the window movement icon 350. Note that reference point 416*a* may correspond to a different position in the 3D environment than reference point 416*b*. In this example, the change of ray 415*a* to ray 415*b* in the XR environment 400 results in the user interface element 430 rotating around to the right as the user turns to the right. From the user's perspective, the user has pinched while looking at the window movement icon 450 and then turned their whole body to the right while pinching to cause a corresponding "drag" of the user interface element 430 to also rotate about the user as the user turns.

Figure 5A:
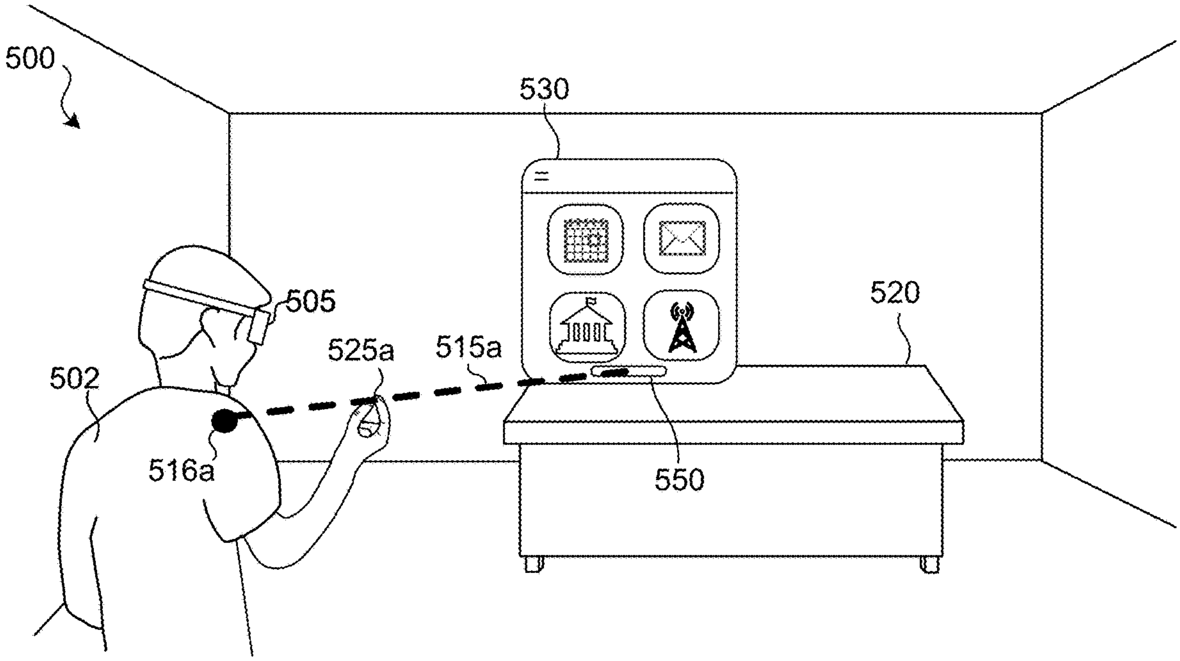
FIG. 5A-5B illustrate a user activity erroneously interpreted to move a user interface element.
Figure 5B:
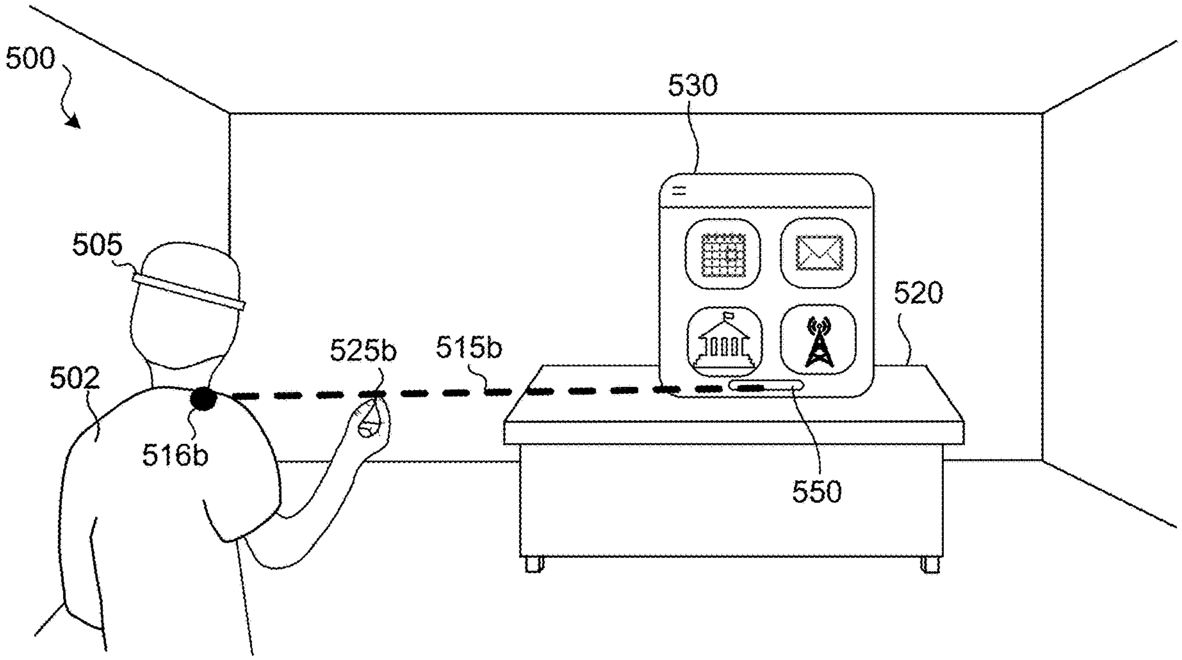

FIG. 5A-5B illustrate a user activity erroneously interpreted to move a user interface element within an XR environment 500. The XR environment 500 includes (and provides relative 3D positioning of) a combination of real-world content (e.g., user 502, device 505, desk 520) and virtual content (e.g., user interface element 530). Rays 515*a* and 515*b* are provided in FIGS. 5A and 5B for illustration purposes and could be determined to facilitate user interface element repositioning but would generally not be (although they could be) displayed or represented in the XR environment 500.

In this example of FIGS. 5A-5B, a user movement corresponds to a change in the position of the user 502 from FIG. 5A to FIG. 5B as the user 502 turns their head to the left (without turning the rest of their body) while performing a pinch gesture. In this example, a user shoulder joint position is considered as a reference position for interpreting user interaction. The device 505 may, for example, determine a device pose (i.e., position and orientation), which corresponds to the user's head pose. Since the user is wearing the device 505, a fixed relationship between the device 505 and the user's head is considered to be fixed. However, in this case, estimating the shoulder joint position based on the device pose and/or corresponding head pose would (and does) result in moving the user interface element 530 in an undesirable manner, i.e., inconsistent with the user's intentions. This is because, as the user turns their head without turning their body, the positional relationship between the device/head and shoulder joint will change (i.e., the head is moving relative to torso rather than the head and torso moving together), resulting in an estimated shoulder joint location that does not correspond to the user's actual shoulder/torso location.

Thus, using the rays 515*a* and 515*b* to determine a repositioning of the user interface element would (and does) result in an erroneous positioning, as illustrated. In FIG. 5A, a ray 515*a* is determined to extend from the reference point 516*a* through pinch centroid position 525*a* and intersect the window movement icon 550 at a position in the XR environment 500 as shown FIG. 5A. The user's movement (i.e., the user turning their head to the left) and reference position change (i.e., based on the user turning their head to the left) results in the ray 515*b* (FIG. 5B) having a different 3D position within the XR environment 500. The ray 515*b* is determined to extend from the reference point 516*b* (determined based on the HMD/head pose at the time of FIG. 4B) through the pinch centroid position 525*b*. If the window movement icon 550 (and the user interface element 530 in which it is found) is repositioned in the XR environment 500 to maintain the intersection of the ray 515*b* with the window movement icon 550, it will be positioned erroneously, in conflict with the user's expectations and intentions as illustrated in FIG. 5B. The user may have expected the window movement icon 550 and associated user interface element 530 to have remained in the same place as it was based on having held their hand in a steady position, but observe the window movement icon 550 and associated user interface element 530 moving to the right based on their head turn. Such a user interface response and others potentially resulting from similar user activity (e.g., other movements in which head and body changes differ) may be undesirable.

Some implementations disclosed herein enable accurate responses to user activity such as those illustrated in FIGS. 2A, 2B, 2C, 3A, 3B, 4A, and 4B, while avoiding or limiting inaccurate responses to user activity such as those illustrated in FIGS. 5A and 5B. Some implementations detect circumstances in which a user interface element's repositioning should be prevented or limited so that user interface elements move as expected by users. In some implementations, when certain head and/or hand movement characteristics are identified, user interface element repositioning is prevented or limited. Some implementations use head and/or hand data to identify circumstances in which torso-based reference position that is inferred from head position is likely to be inaccurate and prevent or limit user interface element repositioning based on the reference position in such circumstances.

Figure 6A:
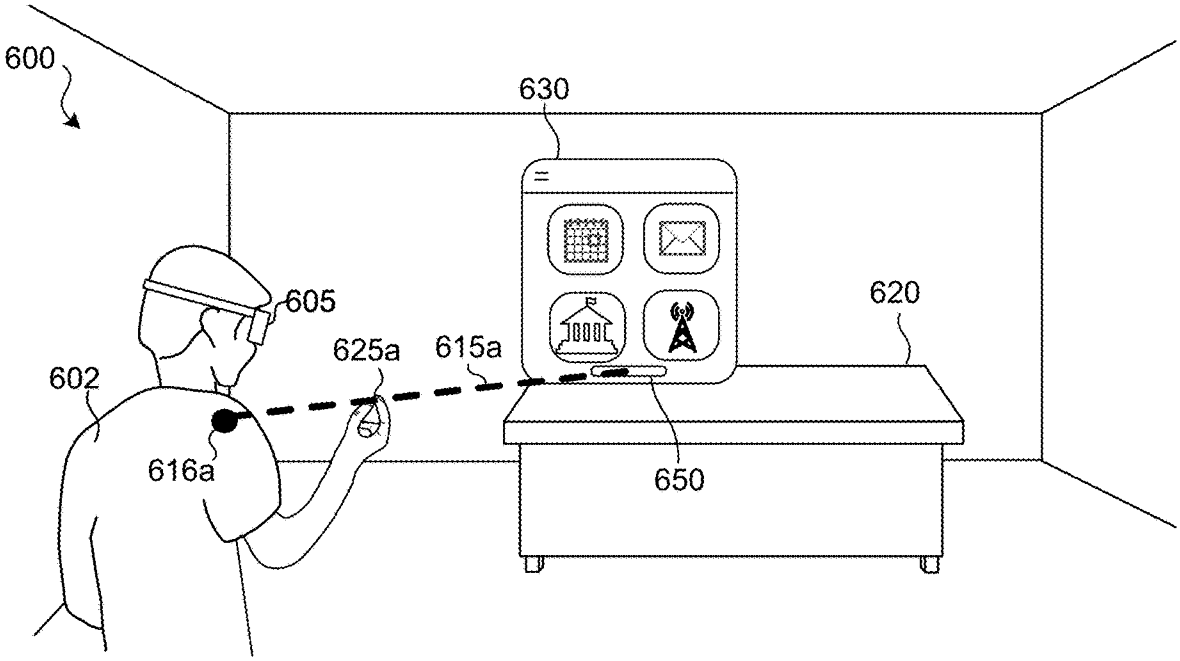
FIG. 6A-6B illustrate fixing a position of a user interface element in circumstances in which user activity is not intended to move the user interface element, in accordance with some implementations.
Figure 6B:
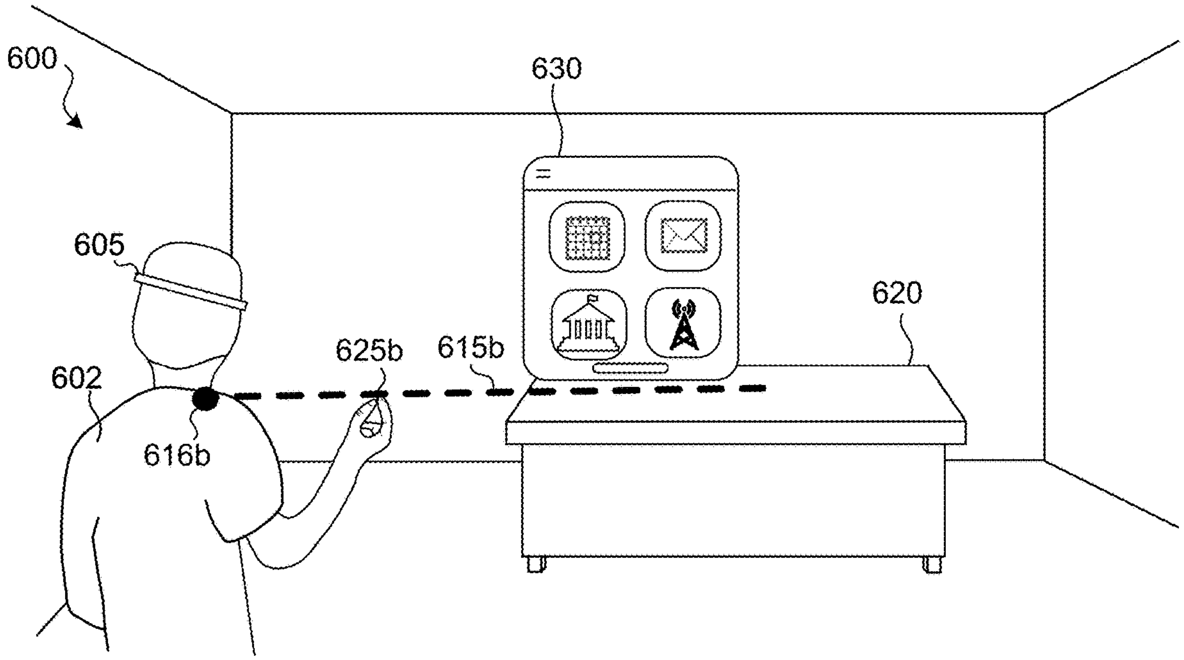

FIG. 6A-6B illustrate fixing a user interface element in circumstances in which user activity is not intended to move the user interface element. The XR environment 600 includes (and provides relative 3D positioning of) a combination of real-world content (e.g., user 602, device 605, desk 620) and virtual content (e.g., user interface element 630). Rays 615*a* and 615*b* are provided in FIGS. 6A and 6B for illustration purposes and could be determined to facilitate user interface element repositioning but would generally not be (although they could be) displayed or represented in the XR environment 600.

Similar to the example of FIGS. 5A-5B, in this example of FIGS. 6A-6B, a user movement corresponds to a change in the position of the user 602 from FIG. 6A to FIG. 6B as the user 602 turns their head to the left (without turning the rest of their body) while performing a pinch gesture. In this example, a user shoulder joint position is considered as a reference position for interpreting user interaction. The device 605 may, for example, determine a device pose (i.e., position and orientation), which corresponds to the user's head pose. Since the user is wearing the device 505 a fixed relationship between the device 605 and the user's head is considered to be fixed. However, in this case, estimating the shoulder joint position based on the device pose and/or corresponding head pose would result in moving the user interface element 530 in an undesirable manner, i.e., inconsistent with the user's intentions. This is because as the user turns their head without turning their body, the positional relationship between the device/head and shoulder joint will change resulting in an estimated shoulder joint location that does not correspond to the user's actual shoulder/torso location. Thus, using the rays 615*a* and 615*b* (determined in the same way as rays 515*a* and 515*b*) to determine a repositioning of the user interface element would result in an erroneous positioning.

In this example, the device 605 detects certain head and hand movement characteristics, and based on those characteristics satisfying one or more criteria, determines to fix the position of the user interface element 630 during that time. Thus, during the user motion from the time of FIG. 6A to the time of FIG. 6B, the user interface element 630 is retained in its original position, i.e., it remains fixed. Such fixed positioning may be consistent with user expectations and intentions. Alternatively, movement of the user interface element 630 may be dampened, e.g., enabled to move in a reduce or restricted manner. The head and hand characteristics that may be used to determine when to fix or dampen user interface element movement are described next with respect to FIGS. 7-9.

Figure 7:
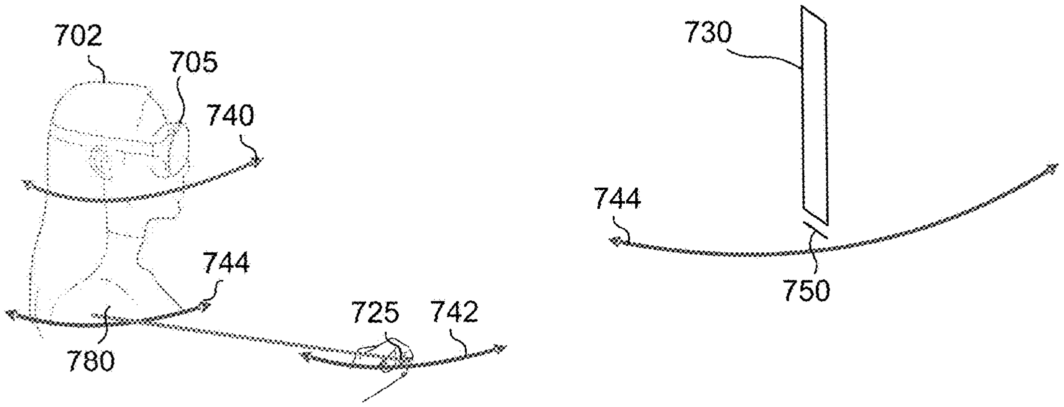
FIG. 7 illustrates examples of hand movement characteristics and head movement characteristics in accordance with some implementations.

FIG. 7 illustrates examples of hand movement characteristics and head movement characteristics. In this example, a user 702 wears device 705 and interacts with a user interface element 730 in an XR environment. The user 702 initiates a movement interaction with window movement icon 750, e.g., by gazing at the window movement icon 750 and pinching their hand. In this example, the window movement icon is a bar that is used to control movement of separate user interface element 730 (i.e., the window movement icon 750 and user interface element 730 are separated but move together based on interaction with the window movement icon 750).

A pinch gesture is detected and used to control movement, e.g., while the user is pinching, any movement of the user's hand causes a corresponding movement of the window movement icon 750 and user interface element 730. In this example, while pinching, the user performs head motion, e.g., turning their head side to side in direction 740, while not moving their torso or hand, i.e., the hand is steady and does not move in direction 742 and the torso 780 is steady and does not move in direction 744. Without mitigation, such head-only motion may result in unintended movement of the user interface element 730 from side to side, e.g., based on the head movement causing as reference position change, as described above with respect to FIGS. 5A, 5B, 6A, and 6B. It may result in unintended or unexpected motion of the window movement icon 750 and user interface element 730 in direction 750.

Other factors may be considered in determining unintended movement mitigations so that such mitigation do not interfere with the desired responses of user interface elements such as user interface element 730. In one situation, a user's whole body rotates around a UI element (e.g., window) while the user is pinching at a grab bar. In this case, the desired behavior may be for the UI element (e.g., window) to rotate in place always facing the user. In another situation, a user's whole body rotates around themself while the user is pinching at a grab bar. In this case, the desired behavior may be for the window to rotate around the user facing him all the time. In another situation, a user walks/turns around corners or otherwise makes significant directional changes while walking and while holding a grab bar. In this case, the desired behavior may be for the window to travel with the user, facing them. In some implementations, the mitigations applied to account for unintended movements should not degrade or otherwise interfere with such responses.

Some implementations mitigate or otherwise avoid unintended user interface movements by identifying circumstances in which it is appropriate to fix the position (and/or orientation) of a user interface element or dampen its repositioning response to certain user activity. Since sensor data may be limited or unavailable from which torso 780 position and/or movement can be detected, some implementations determine when such circumstances exist based on hand movement characteristics and/or head movement characteristics, e.g., by assessing a difference between relative head and hand movement. In one example, this may involve determining a median head angular speed relative to pinch centroid as described with respect to FIG. 8.

In some implementations, user interface element (e.g., window) placement is performed as a function of the distance between a user's shoulder and a pinch centroid. The shoulder position may be estimated based on head pose, which can swing with head rotation, and head rotation may also cause detection of false hand motion/swings. Such false hand motion/swings may be amplified because relatively smaller hand motions may be interpreted using angular criteria such that such motions cause relatively larger movements of user interface elements that are positionally further away, e.g., from an angular reference point Thus, small detected false hand motions may result in relatively large movements of the user interface element. Such responses can provide false window "swimming" in which a user interface element appears to move around as the head moves, even when a user is holding their hand steady or otherwise intending or expecting the element to remain stable at its location in the 3D environment as the head moves. Some implementations enable user interface repositioning techniques that mitigate unintended or unexpected window swim or movement (e.g., based on head motion) while preserving intended placement behaviors (e.g., behaviors illustrated in FIGS. 2A-C, 3A-B, and 4A-B). Preserving intended placement behaviors may enable the user to move the user interface element in, out, sideways etc., rotate their whole body (e.g., on a rotating chair or as illustrated in FIGS. 4A-4B) to cause the element to rotate about the user's body, and/or rotate around the element while the element stays in its place but turns to remain facing the user. Some implementations further enable user interaction responses that avoid noticeable lag or stutter in user interface element motion.

Some implementations, fix a user interface element (e.g., window) location when a head rotation is detected. Doing so may provide stability during head swings but may produce stutter behavior at transitions between fixed and non-fixed period.

Figure 8:
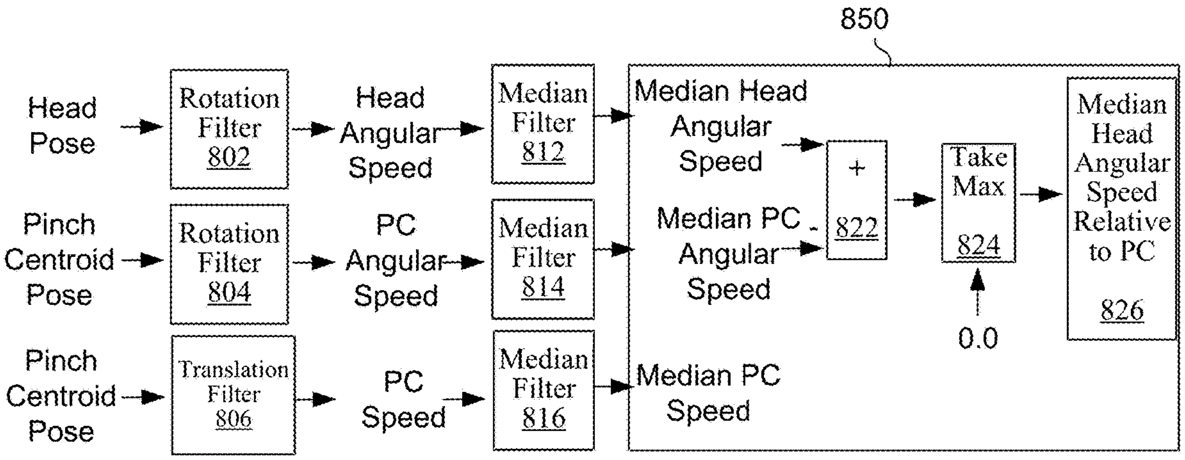
FIG. 8 illustrates an exemplary process for restricting user interface element movement based on head and hand pinch information in accordance with some implementations.

FIG. 8 illustrates an exemplary process for restricting user interface element movement based on head and pinch information. In this example, head pose information (e.g., 6DOF information from device motion and/or other sensors) is passed through a rotation filter 802 (e.g., a g-h-k filter, Kalman filter, g-h filter, etc.) to produce head angular speed, which is passed through a median filter 812 (e.g., identifying a median within a specified time window) to produce a median head angular speed. Pinch centroid (PC) pose information (e.g., 6DOF information from device outward facing image sensor-based hand tracking) is passed through a rotation filter 804 (e.g., a g-h-k filter, Kalman filter, g-h filter, etc.) to produce PC angular speed, which is passed through a median filter 814 (e.g., identifying a median within a specified time window) to produce a median PC angular speed. Note that the median filtering in FIG. 8 is one example. Other types of filtering (e.g., averaging, deadbanding, etc.) or no filtering may be used in alternative implementations.

Some implementations provide stabilization properties (e.g., fixing, dampening, or enabling user interface element movement) based on distinguishing circumstances in which a user's head movement is associated with a user intention to have a user interface element move (e.g., as the user walks around or rotates their entire body) from circumstances in which the user's head movement is not associated with an intention to have a user interface element move (e.g., when the user is shaking or twisting their head in a way that is unrelated to gesturing or other activity associated with an intention to have a user interface element move). Some implementations allow normal user interface element movement in circumstances in which a user's head movement is associated with a user intention to have a user interface element move (e.g., as the user walks around or rotates their entire body). Some implementations restrict or dampen user interface element movement in circumstances in which the user's head movement is not associated with an intention to have a user interface element move (e.g., when the user is shaking or twisting their head in a way that is unrelated to gesturing or other activity associated with an intention to have a user interface element move).

Head and hand movement information can be used in various ways to identify and distinguish such circumstances. Some implementations determine if the user's hand movement differs from the user's head movement (e.g., indicative of head movement unrelated to hand movement and not associated with intentional user interface element movement), so that the system may provide fixed user interface placement or dampened repositioning of the user interface element. The user interface element will not be moved (at all or as much) based on head-based movements that do not correspond to a use intention to have the user interface element move. Some implementations determine if both the head and hand are moving together (e.g., indicative of head movement related to hand/body movement that is associated with intentional user interface element movement), so that the system may provide regular (unfixed/undampened) repositioning of the user interface element.

The difference between median head angular speed and median PC angular speed is generally indicative of whether a user's head is rotating relative to (or with) the user's torso. In this example, the median head angular speed and median PC angular speed (negative of the median PC angular speed) are added at block 822 to identify a difference or otherwise produce a comparison output. The output and a 0.0 value are assessed at take max block 824 to identify a median head angular speed relative to PC value 826. In other words, the "take max" block 824 is taking the max of the difference (from block 822) or 0.0, meaning that if the difference is negative, then 0 is chosen. This value (and/or other values in block 850) may be compared to a threshold to determine whether a user's head is rotating relative to (or with) the user's hand/torso and/or, accordingly, whether to fix or dampen the repositioning of a user interface element.

Restriction or dampening of a user interface element may be performed when the median head angular speed relative to PC 826 is greater than the threshold, e.g., when the circumstances indicate that the head is moving significantly without corresponding to pinch centroid/torso movement. Circumstances in which to fix or dampen the repositioning of a user interface element may be performed using these or other criteria that are indicative of user activity corresponding to an intentional action to move a user interface element (e.g., where head angular speed and PC angular speed are similar—within a similarity threshold) versus an action not intended to move a user interface element (e.g., where head angular speed and PC angular speed are dissimilar—beyond a similarity threshold).

Pinch centroid (PC) pose information (e.g., from device outward facing image sensor-based hand tracking) may additionally (or alternatively) be used to determine when to fix or dampen user interface element position, e.g., pinch centroid translational speed may be used in addition to or an alternative to angular speed. Pinch centroid (PC) pose information may be passed through a translational filter 806 to produce PC speed, which is passed through a median filter 816 (e.g., identifying a median within a specified time window) to produce a median PC speed. For example, this may involve using the last x number (e.g., 2, 3, 5, 10, etc.) of pinch centroid speed values to determine a median speed, e.g., 4.8, 4.9, 5.0, 5.1, and 5.2 values used to determine a median PC speed value −5.0. This value may additionally or alternatively be used to determine whether to fix or dampen the repositioning of a user interface element. For example, in a circumstance in which relative head/PC angular speeds may suggest unintentional movement (i.e., no intention to move a user interface element), the median speed of the PC may indicate otherwise by indicating that the user is in fact doing an intentional interaction. Thus, the user interface element's position may not be fixed or dampening based on detecting user activity characteristics (i.e., median speed of the PC) that are indicative of intentional action to move a user interface element (e.g., a median PC speed above a threshold-hand is moving fast). In various implementations, the system balances indications of intentions based on different head/hand motion characteristics to predict a user's intentions with respect to moving user interface elements and fixes or dampens user interface element positioning accordingly.

As another example, total PC translation may additionally or alternatively be used to determine when to fix or dampen user interface element position, e.g., total PC translational may be used in addition to or an alternative to relative head/PC angular speed and/or PC translational speed. For example, in a circumstance in which relative head/PC angular speeds may suggest unintentional movement (i.e., no intention to move a user interface element), the total PC translation may indicate otherwise by suggesting that the user is involved in a larger scale hand or body movement that is likely associated with an intention to interact. Thus, the user interface element's position may not be fixed or dampening based on detecting user activity characteristics (i.e., total PC translation) that are indicative of intentional action to move a user interface element (e.g., a total PC translation above a threshold-hand/torso has moved significantly over time).

Generally, detection of circumstances in which to fix or dampen the repositioning of a user interface element may be performed by thresholding any of the entities in block 850 or function of these entities and/or using additional or alternative criteria indicative of when user activity corresponds to an intentional action to move a user interface element versus an action not intended to move a user interface element. In other examples, other features, such as total translation, total rotation, acceleration, etc., are used for detection.

In some implementations, different placement states are determined based on detecting various circumstances, e.g., various head and/or hand movement characteristics. In one example, a fixed or dampened placement state may be determined based on a combination of multiple factors, for example, where (a) a median head angular speed relative to PC is greater than a threshold A and (b) a median PC speed is less than a threshold B. Median head angular speed relative to PC being greater than threshold A may be indicative of a user head independently of the user's hand (which may, for example, occur when the user is moving their head independently of the user's hand and/or entire torso), while median PC speed being less than threshold B may be indicative of the user's hand being relatively stationary and/or being less likely to be involved in a gesture. If both circumstances are present, the system may have a significant confidence that the head motion doesn't correspond to intentional UI movement activity and thus determine to fix or dampen movement that would otherwise be triggered.

In contrast, a regular (i.e., non-fixed or non-dampened) placement state may be determined when (a) a median head angular speed relative to PC is less than a threshold C (e.g., potentially indicative of head/hand/torso moving together), or (b) a median PC speed is greater than a threshold D (e.g., hand is moving fast enough to infer that gesturing or intentional interaction is likely occurring), or (c) a total PC translation is greater than a threshold E (e.g., user's total movement of the hand over time is indicative of a large or significant hand or body movement such that inferring intentional gesturing or interaction is appropriate).

In these examples, A, B, C, D, and E are all greater than 0. While threshold A could equal threshold C and threshold B could equal threshold D in the above examples, the system may promote hysteresis by requiring A to be greater than C and D to be greater than B. Other criteria and/or threshold may be used in other implementations.

Various criteria may be used to provide a user experience in which unintended head motion is identified and a user interface element's repositioning fixed or dampened during such motion. However, the criteria may be selected so that the system quickly exits the fixed or dampened state, e.g., based on a minimal amount of hand motion being detected. If both the head and hand are moving together (e.g., as the user walks around or rotates their entire body), the system may provide regular (unfixed) repositioning of the user interface element. On the other hand, when the user is shaking or twisting their head, the repositioning may be paused or dampened.

In some implementations, the criteria are used to determine whether the user is sitting or standing or whether the user is sitting, standing, or walking. User interface element fixation may be applied only in one state (e.g., only providing fixation in the sitting state) or may be applied differently in the different states (e.g., dampening repositioning relatively more in the sitting state versus the standing state). In some implementations, user activity classification is performed to determine when the user is performing head-only rotation or other head only movements and user interface repositioning as restricted or dampened during that state.

In some implementations a stateless algorithm may be desirable, for example, to avoid or reduce stutter at transitions. Since user interface placement may be a function of differential hand motion at each frame, window motion changes (e.g., deltas) may be dampened. A dampening factor can be a function of the entities of block 850 of FIG. 8 (e.g., median head rotational speed, etc.) or other entities that can be computed, for example, from head pose or PC pose.

Figure 9:
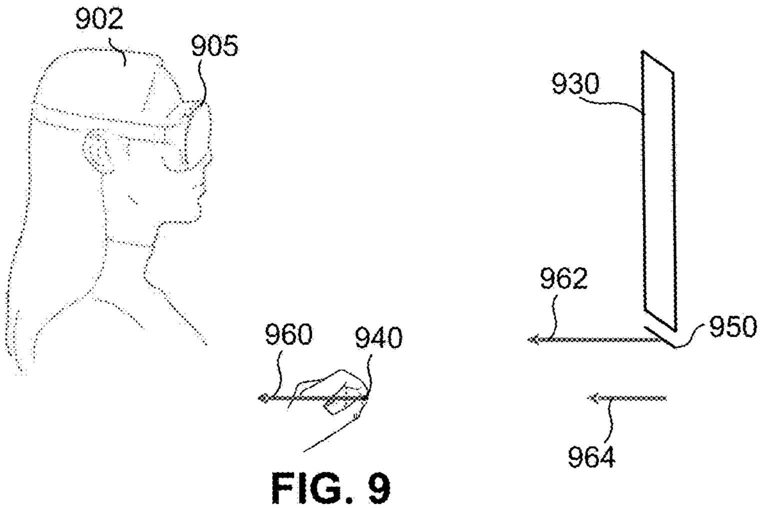
FIG. 9 illustrates an example of dampening user interface element movement in accordance with some implementations.

FIG. 9 illustrates an example of dampening user interface element movement. In this example, the user 902 (wearing device 905) initiates movement of user interface element 930 by interacting with window movement icon 950 (e.g., by pinching while looking at window movement icon 950). The user then moves their hand and thus moves pinch centroid 940 in direction 960. Under regular placement (i.e., without use of a mitigation technique), this would cause a corresponding movement 962 of the window placement icon 950 and user interface element 930. However, based on determining that circumstances exist in which user activity should result in a dampened movement response (e.g., where the reference point position should be moved but not as much as the head moved would suggest given an assumed fixed head/shoulder relationship), the window placement icon 950 and user interface element 930 are repositioned according to dampened movement 962, i.e., moving less than they would otherwise. The dampening may be performed on the frame-to-frame deltas, e.g., reducing the movement between each frame by a specified percentage. In some implementations, the amount of dampening is determined based on characteristics of the current circumstances, e.g., a measure of how much of the user activity corresponds to head-only motion, how much of the user activity corresponds to intended user interface movement activity, how certain or confident the system is that user activity corresponds to head-only motion or intended UI movement activity. In some implementations, the dampening factor depends additionally or alternatively upon a rate of movement, e.g., how fast the head and/or hand are moving.

Dampening may be applied in other contexts as well, e.g., in addition to or alternatively to UI interface element placement. For example, the user might be holding still on a slider (such as a movie scroll bar) while shaking/rotating/moving their heads. In this case may determine that the slider should not move from the current location and dampen movement accordingly.

Figure 10:
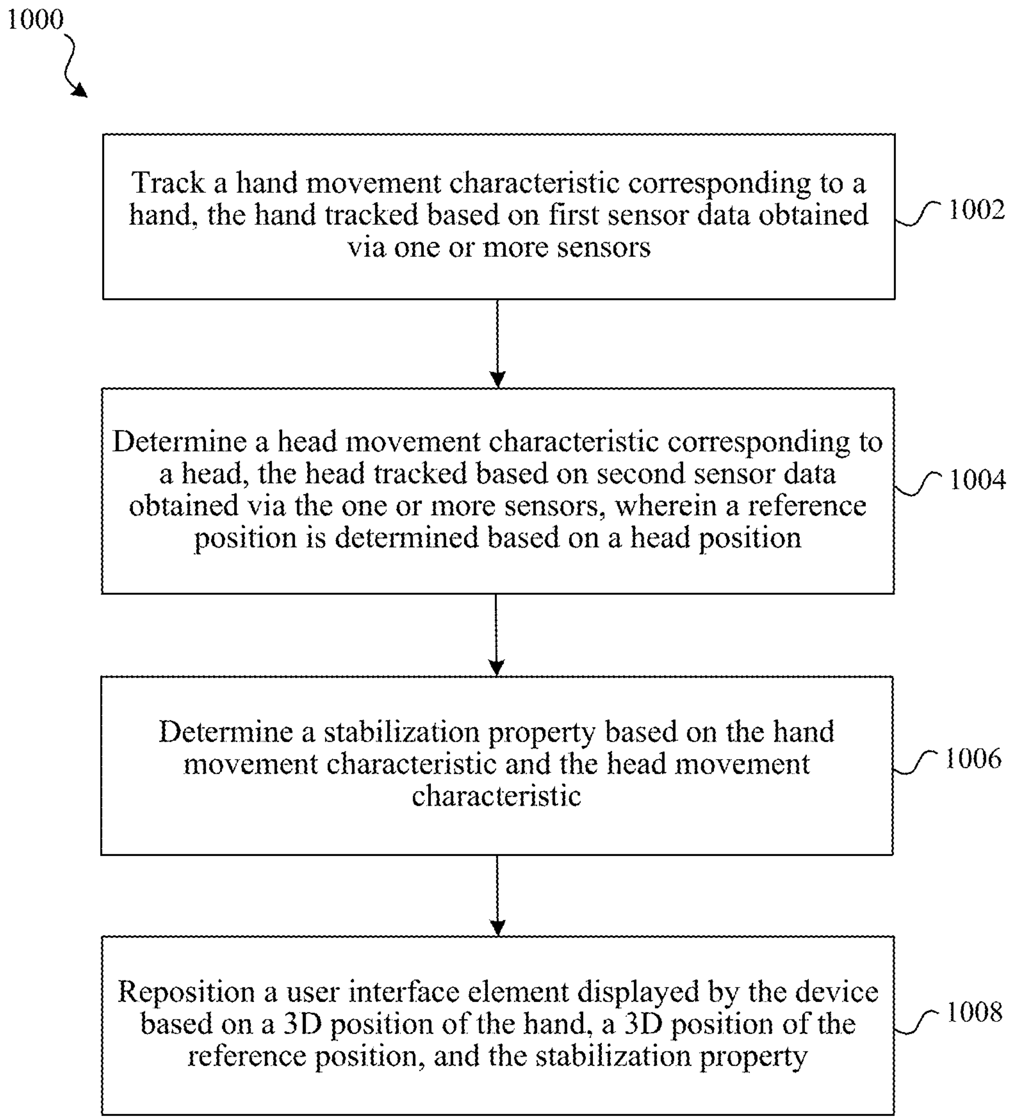
FIG. 10 is a flowchart illustrating a method for repositioning a user interface element in accordance with some implementations.

FIG. 10 is a flowchart illustrating a method for repositioning a user interface element. In some implementations, a device such as electronic device 105, performs method 1000. In some implementations, method 1000 is performed on a mobile device, desktop, laptop, HMD, or server device. The method 1000 is performed by processing logic, including hardware, firmware, software, or a combination thereof. In some implementations, the method 1000 is performed on a processor executing code stored in a non-transitory computer-readable medium (e.g., a memory). The method 1000 may be performed at an input support process, e.g., via a OS or system-level process.

At block 1002, the method 1000 involves tracking a hand movement characteristic corresponding to a hand. The hand may be tracked based on first sensor data obtained via the one or more sensors. Tracking the hand characteristic may involve tracking movement, angular speed, or other attribute of a pinch centroid, i.e., a position associated with user gesture involving pinching together two or more fingers. In one example, a position of a pinch (e.g., pinch centroid) is determined based on images captured by the one or more sensors, e.g., via outward facing sensors of a head mounted device (HMD).

At block 1004, the method 1000 may further involve determining a head movement characteristic corresponding to a head. The head may be tracked based on second sensor data obtained via the one or more sensors. A reference position (e.g., shoulder joint, chest point, elbow joint, wrist joint, etc.) may be determined based on a head position (e.g., a tracked head pose). Determining the head movement characteristic may involve data from the one or more sensors. For example, this may involve using motion sensors and/or other sensors on an HMD worn on a head of a user to track head pose (e.g., 6DOF position and orientation) and using that head pose to infer probably shoulder positions, e.g., based on an assumed fixed relationship between head pose and shoulder position. In some implementations, the head movement characteristic may include a measure of motion of the head such as angular speed, etc.

In some implementations, the reference position is separate from the head. In some implementations, the reference position is a shoulder joint, position on or in the user's torso, an elbow joint, a position on or in the user's arm, etc. In some implementations, a reference position such as a shoulder joint position is inferred based on a position and orientation of the head of the user or a device worn on the head of the user. In some implementations, the reference position corresponds to a position on or within a torso of the user, wherein sensor data directly observing the torso is unavailable for at least a period of time.

At block 1006, the method 1000 may further involve determining a stabilization property based on the hand movement characteristic and the head movement characteristic. In one example, the stabilization property is determined based on detecting head rotation that is mostly independent of and/or significantly different than hand motion. The stabilization property may fix the position of a user interface element that is being controlled by the hand motion (e.g., allowing no movement of the user interface element) when a threshold head-to-hand motion differential is exceeded. The stabilization may dampen movement of the user interface element based on the relative amount head motion exceeds hand motion.

In some implementations, the stabilization property is determined based on elements described with respect to FIGS. 7-9. In some implementations, the stabilization property is determined based on a relationship between the head movement characteristic and the hand movement characteristic. In some implementations, the stabilization property is determined based on detecting an amount of head rotation that is independent of hand motion. In some implementations, the stabilization property is determined to prevent (i.e., fix) the repositioning of the user interface element based on: a median head angular speed relative to the 3d position of the hand exceeding a threshold. In some implementations, the stabilization property is determined to dampen the repositioning of the user interface element based on: a median head angular speed relative to the 3D position of the hand exceeding a threshold. In some implementations, the stabilization property is determined to prevent (i.e., fix) the repositioning of the user interface element based on: a median hand speed being less than a threshold. In some implementations, the stabilization property is determined to dampen the repositioning of the user interface element based on: a median hand speed being less than a threshold. In some implementations, the stabilization property is determined to enable undampened repositioning of the user interface element based on: a median head angular speed relative to the 3D position of the hand being less than a threshold. The stabilization property is determined to enable undampened repositioning of the user interface element based on: a median hand speed being greater than a threshold. The stabilization property is determined to enable undampened repositioning of the user interface element based on: a total amount of hand translation being greater than a threshold.

At block 1008, the method 1000 may further involve repositioning a user interface element displayed by the device based on a three-dimensional (3D) position of the hand (e.g., pinch centroid location), a 3D position of the reference position (e.g., shoulder location), and the stabilization property. This may involve fixing or dampening movement of the user interface element in certain circumstances. Such fixing or dampening may prevent unintended movement of the user interface element, for example, in circumstances in which a user shakes their head side to side. Such side-to-side head motion may otherwise (without the fixing or dampening) of the UI element by causing movement of a reference position associated with the head's pose that does not correspond to the position of the portion of the user's body associated with the reference position, e.g., an inferred shoulder position may differ from the actual shoulder position as the user shakes their head side-to-side.

Implementations disclosed herein stabilize user interface elements in these and other circumstances in which certain user activity is not intended to result in user interface element motion.

In some implementations, the 3D position of the hand is a pinch centroid location and the 3D position of the reference position is a shoulder joint location.

In some implementations, the repositioning of the user interface element determines to change a 3D position of the user interface element based on a ray direction from a shoulder joint location through the pinch centroid location. FIGS. 3A-3B provide an example.

In some implementations, the repositioning of the user interface element determines to change a 3D position of the UI element based on a distance between the shoulder joint location and the pinch centroid location. FIGS. 2A and 2C provide an example.

Figure 11:
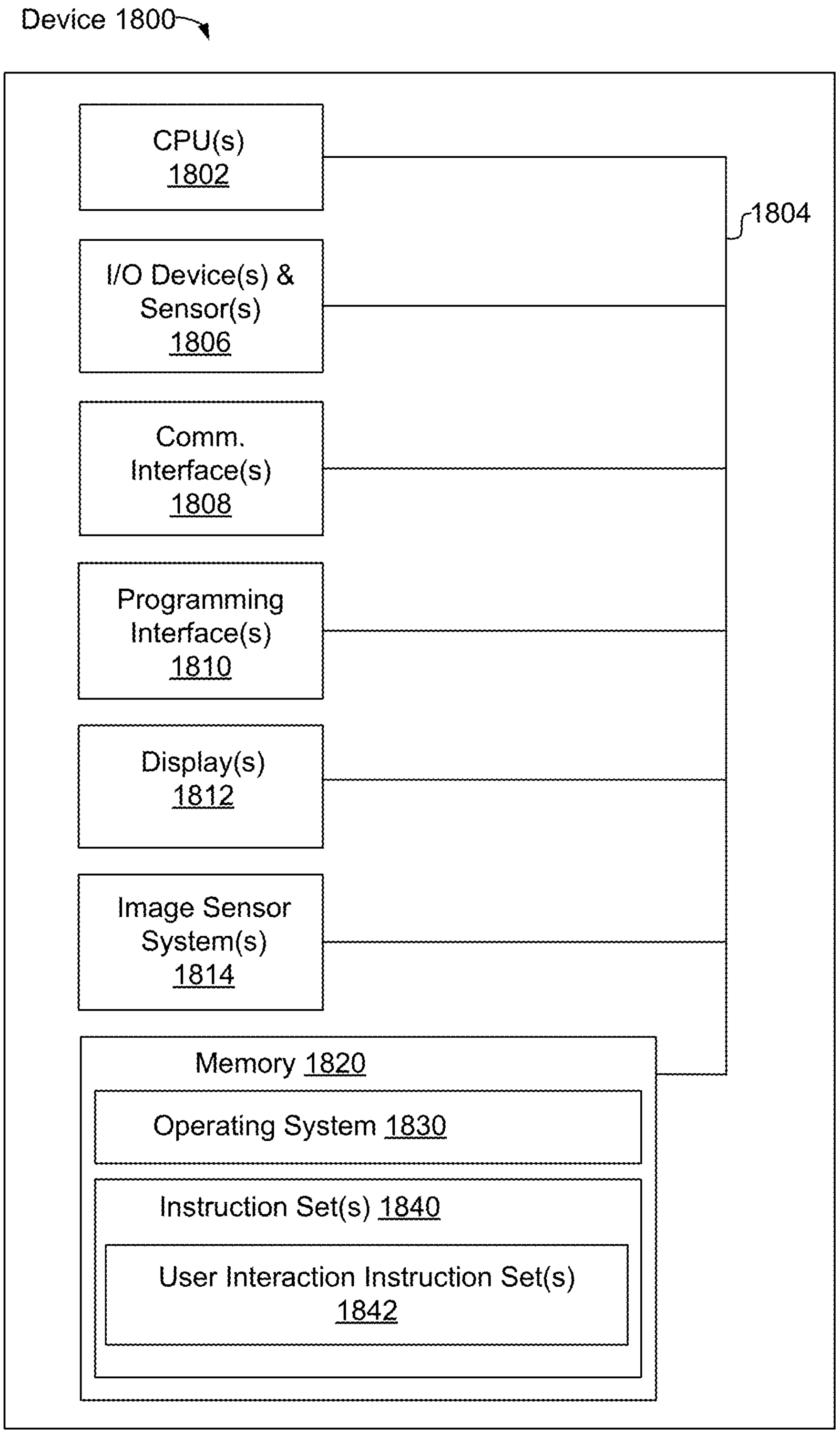
FIG. 11 is a block diagram of an electronic device of in accordance with some implementations.

FIG. 11 is a block diagram of electronic device 1800. Device 1800 illustrates an exemplary device configuration for electronic device 105 (or any of the other electronic devices described herein). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1800 includes one or more processing units 1802 (e.g., microprocessors, ASICs, FPGAs, GPUs, CPUs, processing cores, and/or the like), one or more input/output (I/O) devices and sensors 1806, one or more communication interfaces 1808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1810, one or more output device(s) 1812, one or more interior and/or exterior facing image sensor systems 1814, a memory 1820, and one or more communication buses 1804 for interconnecting these and various other components.

In some implementations, the one or more communication buses 1804 include circuitry that interconnects and controls communications between system components. In some implementations, the one or more I/O devices and sensors 1806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 1812 include one or more displays configured to present a view of a 3D environment to the user. In some implementations, the one or more displays 1812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1800 includes a single display. In another example, the device 1800 includes a display for each eye of the user.

In some implementations, the one or more output device (s) 1812 include one or more audio producing devices. In some implementations, the one or more output device(s) 1812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1812 may additionally or alternatively be configured to generate haptics.

In some implementations, the one or more image sensor systems 1814 are configured to obtain image data that corresponds to at least a portion of a physical environment. For example, the one or more image sensor systems 1814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1814 further include illumination sources that emit light, such as a flash. In various implementations, the one or more image sensor systems 1814 further include an on-camera image signal processor (ISP) configured to execute a plurality of processing operations on the image data.

The memory 1820 includes high-speed random-access memory, such as DRAM, SRAM, DDR RAM, or other random-access solid-state memory devices. In some implementations, the memory 1820 includes non-volatile memory, such as one or more magnetic disk storage devices, optical disk storage devices, flash memory devices, or other non-volatile solid-state storage devices. The memory 1820 optionally includes one or more storage devices remotely located from the one or more processing units 1802. The memory 1820 comprises a non-transitory computer readable storage medium.

In some implementations, the memory 1820 or the non-transitory computer readable storage medium of the memory 1820 stores an optional operating system 1830 and one or more instruction set(s) 1840. The operating system 1830 includes procedures for handling various basic system services and for performing hardware dependent tasks. In some implementations, the instruction set(s) 1840 include executable software defined by binary information stored in the form of electrical charge. In some implementations, the instruction set(s) 1840 are software that is executable by the one or more processing units 1802 to carry out one or more of the techniques described herein.

The instruction set(s) 1840 include user interaction instruction set(s) 1842 configured to, upon execution, identify and/or interpret user gestures and other user activities, including by restricting or dampening user interface element repositioning, as described herein. The instruction set(s) 1840 may be embodied as a single software executable or multiple software executables.

Although the instruction set(s) 1840 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at an electronic device having a processor and one or more sensors:

tracking a hand movement characteristic corresponding to a hand, the hand tracked based on first sensor data obtained via the one or more sensors;

determining a head movement characteristic corresponding to a head, the head tracked based on second sensor data obtained via the one or more sensors, wherein a reference position is determined based on a head position, and wherein the reference position is associated with a wrist or an elbow;

determining a stabilization property based on the hand movement characteristic and the head movement characteristic; and repositioning a user interface element displayed by the device based on a three-dimensional (3D) position of the hand, a 3D position of the reference position, and the stabilization property.

2. The method of claim 1, wherein the stabilization property is determined based on a relationship between the head movement characteristic and the hand movement characteristic.

3. The method of claim 1, wherein the stabilization property is determined based on detecting an amount of head rotation that is independent of hand motion.

4. The method of claim 1, wherein the stabilization property is determined to prevent the repositioning of the user interface element based on:

a median head angular speed relative to the 3d position of the hand exceeding a threshold.

5. The method of claim 1, wherein the stabilization property is determined to dampen the repositioning of the user interface element based on:

a median head angular speed relative to the 3D position of the hand exceeding a threshold.

6. The method of claim 1, wherein the stabilization property is determined to prevent the repositioning of the user interface element based on:

a median hand speed being less than a threshold.

7. The method of claim 1, wherein the stabilization property is determined to dampen the repositioning of the user interface element based on: a median hand speed being less than a threshold.

8. The method of claim 1, wherein the stabilization property is determined to enable undampened repositioning of the user interface element based on:

a median head angular speed relative to the 3D position of the hand being less than a threshold.

9. The method of claim 1, wherein the stabilization property is determined to enable undampened repositioning of the user interface element based on:

a median hand speed being greater than a threshold.

10. The method of claim 1, wherein the stabilization property is determined to enable undampened repositioning of the user interface element based on:

a total amount of hand translation being greater than a threshold.

11. The method of claim 1, wherein the reference position is separate from the head.

12. The method of claim 1, wherein the 3D position of the hand is a pinch centroid location and the 3D position of the reference position is a shoulder joint location.

13. The method of claim 12, wherein the repositioning of the user interface element determines to change a 3D position of the user interface element based on a ray direction from a shoulder joint location through the pinch centroid location.

14. The method of claim 12, wherein the repositioning of the user interface element determines to change a 3D position of the UI element based on a distance between the shoulder joint location and the pinch centroid location.

15. The method of claim 1, wherein the device is a head-mounted device (HMD).

16. The method of claim 1, wherein the reference position is associated with a wrist.

17. The method of claim 1, wherein the reference position is associated with an elbow.

18. A method comprising:

at an electronic device having a processor and one or more sensors:

tracking a hand movement characteristic corresponding to a hand, the hand tracked based on first sensor data obtained via the one or more sensors;

determining a head movement characteristic corresponding to a head, the head tracked based on second sensor data obtained via the one or more sensors, wherein a reference position is determined based on a head position, and wherein the reference position is associated with a shoulder joint;

determining a stabilization property based on the hand movement characteristic and the head movement characteristic; and repositioning a user interface element displayed by the device based on a three-dimensional (3D) position of the hand, a 3D position of the reference position, and the stabilization property.

19. The method of claim 18, wherein a position of the shoulder joint is inferred based on a position and orientation of the head.

20. A method comprising:

at an electronic device having a processor and one or more sensors:

tracking a hand movement characteristic corresponding to a hand, the hand tracked based on first sensor data obtained via the one or more sensors;

determining a head movement characteristic corresponding to a head, the head tracked based on second sensor data obtained via the one or more sensors, wherein a reference position is determined based on a head position, wherein the reference position corresponds to a position on or within a torso of the user, and wherein sensor data directly observing the torso is unavailable for at least a period of time;

determining a stabilization property based on the hand movement characteristic and the head movement characteristic; and repositioning a user interface element displayed by the device based on a three-dimensional (3D) position of the hand, a 3D position of the reference position, and the stabilization property.

21. A system comprising: memory; and one or more processors coupled to the memory, wherein the memory comprises program instructions that, when executed by the one or more processors, cause the system to perform operations comprising:

tracking a hand movement characteristic corresponding to a hand, the hand tracked based on first sensor data obtained via the one or more sensors;

determining a head movement characteristic corresponding to a head, the head tracked based on second sensor data obtained via the one or more sensors, wherein a reference position is determined based on a head position, and wherein the reference position is associated with a shoulder, torso, wrist or elbow;

determining a stabilization property based on the hand movement characteristic and the head movement characteristic; and repositioning a user interface element displayed by the device based on a three-dimensional (3D) position of the hand, a 3D position of the reference position, and the stabilization property.

22. A non-transitory computer-readable storage medium, storing program instructions computer-executable on a computer to perform operations comprising:

tracking a hand movement characteristic corresponding to a hand, the hand tracked based on first sensor data obtained via the one or more sensors;

determining a head movement characteristic corresponding to a head, the head tracked based on second sensor data obtained via the one or more sensors, wherein a reference position is determined based on a head position, and wherein the reference position is associated with a shoulder, torso, wrist or elbow;

determining a stabilization property based on the hand movement characteristic and the head movement characteristic; and repositioning a user interface element displayed by the device based on a three-dimensional (3D) position of the hand, a 3D position of the reference position, and the stabilization property.

* * * * *